United States Patent [19]

Meltz et al.

[11] Patent Number: 4,821,802

[45] Date of Patent: Apr. 18, 1989

[54] AQUEOUS SULFOMETHYLATED MELAMINE GEL-FORMING COMPOSITIONS AND METHODS OF USE

[75] Inventors: Clifford N. Meltz; Gordon D. Gruetzmacher, both of Gales Ferry; Ping W. Chang, Waterford, all of Conn.

[73] Assignee: Pfizer Inc., New York, N.Y.

[21] Appl. No.: 239,062

[22] Filed: Sep. 1, 1988

Related U.S. Application Data

[62] Division of Ser. No. 746,821, Jun. 20, 1985, Pat. No. 4,772,641.

[51] Int. Cl.[4] .......................................... E21B 33/138
[52] U.S. Cl. ................................. 166/270; 166/295; 166/300; 523/130
[58] Field of Search ............... 166/270, 294, 295, 300; 523/130

[56] References Cited

U.S. PATENT DOCUMENTS

| | | | |
|---|---|---|---|
| 2,407,599 | 3/1946 | Auten et al. | 260/69 |
| 2,562,866 | 10/1951 | Kartz et al. | 260/29.4 |
| 2,603,623 | 7/1952 | Bonzagni et al. | 260/67.6 |
| 2,730,497 | 1/1956 | Suen et al. | 252/8.5 |
| 2,730,516 | 1/1956 | Suen et al. | 260/67.6 |
| 4,405,690 | 9/1983 | Brooker | 524/843 |
| 4,430,469 | 2/1984 | Bürge | 524/843 |
| 4,473,119 | 9/1984 | Falk | 166/295 |

*Primary Examiner*—George A. Suchfield
*Attorney, Agent, or Firm*—Peter C. Richardson; Lawrence C. Akers; Robert F. Sheyka

[57] ABSTRACT

Aqueous gel-forming compositions are prepared by reacting for 1–10 hours at 50°–95° C., melamine, formaldehyde and a sulfurous acid salt with the optional addition of a gel-modifying agent and/or a gelling agent which is added to the composition immediately prior to use.

5 Claims, No Drawings

AQUEOUS SULFOMETHYLATED MELAMINE GEL-FORMING COMPOSITIONS AND METHODS OF USE

This is a division of application Ser. No. 746,821, filed on June 20, 1985, now U.S. Pat. No. 4,772,641.

BACKGROUND OF THE INVENTION

During the recovery of hydrocarbons from subterranean formations, significant amounts of displaceable hydrocarbons are left behind because the reservoir strata are non-homogeneous. The natural drive fluids (e.g. brine or gaseous hydrocarbons) or secondary recovery flooding fluids (e.g. brine, steam, or carbon dioxide) flow through the more permeable strata of the reservoir resulting in progressively less hydrocarbon being recovered per unit volume of fluid produced. This increased ratio of drive or flooding fluid to hydrocarbon is usually referred to as early breakthrough of flooding fluid from injector wells or as excessive water encroachment in producer wells. It is desirable to increase the sweep efficiency, thereby producing more hydrocarbon per unit volume of fluid recovered. Chemicals have been used to achieve increased sweep efficiencies and to enhance hydrocarbon recovery by modifying the permeability of reservoir strata so that the natural or flooding fluids flow through hydrocarbon-rich strata in preference to strata that are more permeable and contain none or smaller amounts of recoverable hydrocarbons.

The chemicals that can be used to modify the permeabilities of subterranean reservoirs must be easily pumpable (i.e. not excessively viscous) so that they can be easily emplaced into the reservoir sufficiently far from the wellbore so as to be effective. It is desirable for the chemicals to reduce the permeability of the reservoir to the driving or flooding fluids while retaining most hydrocarbon permeability. Their emplacement should be selective in that they are emplaced into and reduce the permeability of reservoir strata more permeable to the driving fluids without seriously affecting the less permeable strata. Gels formed by polyacrylamide (U.S. Pat. No. 3,490,533) or polysaccharides with cations (U.S. Pat. No. 3,581,524; U.S. Pat. No. 3,908,760; U.S. Pat. No. 4,048,079) have been used as permeability modifiers for subterranean reservoirs. However, their application has been limited to subterranean reservoirs with ambient temperatures of less than about 70° C. Major difficulties encountered is using gel forming chemicals in high temperature reservoirs (i.e. >70° C.) include:

(1) Increasing gelation rate with increasing temperature resulting in premature gel formation and therefore plugging of the reservoir strata nearest the wellbore with the needed permeability modification at substantial distances from the wellbore being unattainable.

(2) Over-crosslinking and syneresis of the gel at elevated temperatures and in high total dissolved solid (TDS) reservoir brines which reduce the effectiveness of the gel as a permeability modifier.

(3) Decomposition by oxidation and/or hydrolytic mechanisms of polysaccharides and polyacrylamides at elevated temperatures with a net result of destruction of gel character. Some of the acrylamide groups of the polyacrylamide hydrolyze to carboxylic acid groups at elevated temperatures which causes the polyacrylamide to form calcium and magnesium salts resulting in precipitates which are undesirable.

Melamine resins have been employed for a number of uses including adhesives, laminating resins, molding compounds, coatings, textile finishes and paper treatment (I. H. Updegraff et al, Kirk-Othmer Encyclopedia of Chemical Technology, Vol. 2, pp. 440-469, 1982). The subject of this invention, sulfomethylated melamine polymers, has also found a number of uses. U.S. Pat. No. 2,407,599 claims a process for preparing thermosetting resinous products containing sulfonate groups by reacting at pH 4-10; (1) an aldehyde (e.g. formaldehyde), (b) a water soluble salt of sulfurous acid, and (c) a member of the class consisting of carboamides, polyamino diazines and polyamino triazines (e.g. melamine). The aldehyde is present in an amount between about 0.5 and 2.0 moles per reactive amino group and said salt in an amount between about 0.05 to about 0.4 mole of bisulfite per mole of aldehyde. This patent also claims compositions prepared by the claimed process. U.S. Pat. No. 2,562,866 claims a process for preparing melamine-aldehyde sealing agents for porous formations penetrated by boreholes as well as compositions prepared by the process. These compositions are not water soluble and must be used as an aqueous suspension. A process for preparing a solid thermosetting resin useful as a textile finishing agent and a paperwet strength agent and compositions prepared by the process are claimed by U.S. Pat. No. 2,603,623. The process consists of reacting a water soluble preformed etherified melamine-formaldehyde resin in an aqueous solution with an alkali metal salt of sulfurous acid sufficient to provide at least 0.1 mole of combined sulfur trioxide for each mole of melamine. Sulfomethylated melamine resins are claimed as water loss additives for drilling fluids in U.S. Pat. No. 2,730,497 with specific claims being for drilling fluid compositions. U.S. Pat. No. 2,730,516 claims a process for producing non-thermosetting, permanently water-soluble melamine-formaldehyde resinous compositions modified with an alkali metal salt of sulfurous acid which are useful as replacements for natural hydrophilic hydrocolloids (e.g. gelatin and agar). The mole ratios of reactants are 1.0 melamine, 1.75-6.0 formaldehyde and 0.75-2.0 of sulfurous acid salt. A range of pH of between about 1.5 and about 3.7 is necessary during the polymerization of the product, and the temperature range is 40-55° C. Compositions prepared by this process are also claimed.

U.S. Pat. No. 4,473,119 claims a process for selectively plugging highly permeable zones in a subterranean formation by injecting a melamine-formaldehyde solution via a well into the highly permeable zones. A solution of melamine and formaldehyde in a water soluble solvent (e.g. alcohol) is injected into an alkaline formation environment. The solution preferentially migrates into the highly permeable zones which contain substantial amounts of water. The solution reacts in situ at the formation temperature to produce a nonflowing, water insoluble resin. The resin permanently plugs the highly permeable zones. Although the method of this patent appears simple to operate, those skilled in the art will recognize several deficiencies in this process.

(1) The methylolmelamine prepared by the reaction of melamine and formaldehyde in an aqueous solution is not soluble in brines of >1.0% TDS. The presence of alcohols in a brine does not increase the solubility of the methylolmelamine in that brine. Often in an oil field sources of large amounts of fresh water (i.e. <1%

TDS) are not available or are available at great expense. Furthermore, in brines of >1% TDS the resins formed from methylolmelamine at high temperatures (i.e. >70° C.) are precipitate-like in nature and useless as plugging agents. Thus, it is highly desirable to have gel-forming compositions that are soluble in the reservoir brine (e.g. brines up to about 20% TDS) and then to form high temperature stable gels in these brines in the reservoir.

(2) An alternate embodiment describes the use of a slurry of melamine and formaldehyde in water which is then injected immediately into the formation. This technique has the potential for severe face plugging of the formation at the wellbore. Thus, aqueous solutions with no suspended particles are highly desirably for proper emplacement of the gel-forming composition.

(3) It is highly desirable to have a gel-forming composition that will selectively enter the strata of the reservoir more permeable to driving fluid and form gels; thus, effecting a selective permeability modification of more permeable strata of the reservoir and leaving the less permeable strata relatively less affected. In addition, it is desirable that the porous medium, where the gelled gel-forming compositions are emplaced, be selectively more permeable to hydrocarbons than to flooding fluids. In general, insoluble resins such as those exemplified in U.S. Pat. No. 4,473,119, form undesirable plugs that block completely all flow through the treated strata of the reservoir including the flow of the desired hydrocarbons. They are also nearly impossible to remove from the reservoir if improperly emplaced due to their insolubility.

Thus, it can be seen that there is a need for brine compatible, high temperature stable and high temperature emplacable permeability modifiers for use in subterranean hydrocarbon-bearing reservoirs that do not completely block the flow of hydrocarbons in the affected strata.

SUMMARY OF THE INVENTION

The sulfomethylated melamine gel-forming compositions of this invention are useful in the recovery of hydrocarbons from hydrocarbon-bearing subterranean reservoirs. Treatment of the strata of a subterranean reservoir with one of the gel-forming compositions of this invention allows one to selectively modify the strata of the reservoir so that the treated strata of the reservoir are more permeable to hydrocarbons than to flooding fluids such as brine. By careful selection of the gel-forming composition one is able to modify the permeability of a wide variety of reservoirs under a variety of conditions. The useful range of emplacement temperatures for these gel-forming compositions is from about 20° C. to about 120° C.; however, the resultant gels are stable up to at least 200° C. Gels can be made in a variety of aqueous solutions ranging from fresh water to brines containing up to about 20% TDS.

The gel-forming compositions of this invention are prepared by reacting melamine or a substituted melamine, formaldehyde, and sodium sulfite in an aqueous medium for 1-10 hours at 50-95° C. An optional gel modifying agent may be added to the reaction mixture in order to achieve certain desirable gel properties. Especially useful gel modifying agents are aromatic amines that are substituted with electron-withdrawing substituents. Examples of such aromatic amines are p-sulfanilic acid (4-aminobenzenesulfonic acid), p-nitroaniline, p-aminobenzoic acid, 2,4-dinitroaniline, and 2-naphthylamine. Other gel modifying agents also are useful such as poly(vinyl alcohol), poly(acrylamide), ethylene glycol, glycerol, certain poly(oxyalkylene) amines, primary and secondary polyamines, and formaldoxime. Immediately prior to use an optional gelling agent may be added to the gel-forming composition in order to regulate the gel time.

Another part of this invention is a method for the selective modification of the permeability of the strata of a subterranean reservoir by the use of these gel-forming compositions. This modification is accomplished by introducing into a well in communication with the reservoir a gel-forming composition as described above at a pH of 5-11, shutting-in the well and allowing the composition to gel in the reservoir for 1 hour to 30 days. The method is useful for the treatment of reservoirs penetrated by injector wells as well as producer wells and for reservoirs undergoing all sorts of fluid flooding such as brine, stream and carbon dioxide flooding.

A final feature of this invention is a process for preparing aqueous gel-forming sulfomethylated melamine compositions which are useful in the modification of the strata of subterranean reservoirs. The process comprises reacting for 1-10 hours at 50-95° C. in an aqueous medium: melamine or a substituted melamine, formaldehyde, and sodium sulfite with the optional use of a gel modifying agent. Immediately prior to use an optional gelling agent may be added to the composition in order to achieve the desired gel time.

DETAILED DESCRIPTION OF THE INVENTION

The present invention comprises an aqueous gel-forming composition, useful in the recovery of hydrocarbons from hydrocarbon-bearing subterranean reservoirs, comprising a 1.0–60.0 weight percent sulfomethylated melamine polymer solution prepared by reacting for 1-10 hr at 50-95° C. in an aqueous medium:

(A) 1.0 molar equivalent of a melamine of the formula

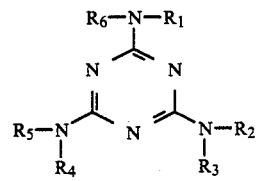

wherein $R_1$ through $R_6$ are selected from the group consisting of hydrogen; carboxymethyl; hydroxyethyl; 2,3-dihydroxypropyl and 2,3-epoxypropyl with the proviso that at least 2 of $R_1$ through $R_6$ be hydrogen and that the remainder or $R_1$ through $R_6$ be identical;

(B) 3.0–6.7 molar equivalents of formaldehyde or a 2–6 carbon atom containing dialdehyde such as glyoxal or glutaraldehyde;

(C) 0.25–1.25 molar equivalents of an alkali metal or ammonium salt of sulfurous acid;

(D) 0–1.5 molar equivalents of a gel-modifying agent selected from the group comprising:
  (1) a ring substituted primary aniline or primary naphthylamine where the substituent is electron-withdrawing such as p-sulfanilic acid, p-nitroaniline, p-aminobenzoic acid, 2,4-dinitroaniline or 2-naphthylamine;
  (2) poly(vinyl alcohol) of MW range 3,000–78,000;

(3) ethylene glycol;
(4) poly(acrylamide) of MW range 10,000–100,000;
(5) glycerol;
(6) a poly(oxyethylene) or poly(oxypropylene) primary amine or a poly(oxyethylene) or poly(oxypropylene) secondary di- or tri-amine of MW 300 to 2,000;
(7) formaldoxime; and
(8) primary and secondary polyamines containing from 2–30 carbon atoms; and (E) 0–5.0 molar equivalents of a water soluble acid generating gelling agent which is added to the above aqueous composition immediately prior to use;

with the proviso that at least one of components (D) or (E) be present in at least a 0.01 molar equivalent amount when $R_1$ through $R_6$ are all hydrogen.

The composition is preferred wherein both components (D) or (E) are present and wherein all of $R_1$ through $R_6$ are hydrogen as well as wherein component (B) is formaldehyde.

The composition is especially preferred wherein $R_1$ through $R_6$ are hydrogen, component (B) is formaldehyde and said gel-modifying agent is present and is sulfanilic acid. Also especially preferred is the composition wherein $R_1$ through $R_6$ are hydrogen, component (B) is formaldehyde, the gel-modifying agent is present and is sulfanilic acid and the gelling agent is also present and is sodium fluoroborate.

These compositions have certain advantages over the currently available materials for the modification of the permeability of the strata of hydrocarbon-bearing subterranean reservoirs. These compositions are stable at temperatures of up to at least 200° C. This is a clear advantage over other permeability modifiers such as poly(acrylamide) and xanthan gum (and other carbohydrate derived polymers) which are not stable at temperatures >70° C. because of the reasons discussed above. The useful range of emplacement temperatures for these sulfomethylated melamine gel-forming compositions is from about 20° C. to about 120° C. with the upper part of the range of about 70° C. to about 120° C. being most useful.

The sulfomethylated melamine gel-forming compositions of this invention are also compatible with a wide variety of brines of varying salinities and hardness. Experiments have shown that these gel-forming compositions are effective gelling agents in brines of up to about 20% TDS and hardness levels of up to about 5000 ppm total calcium and magnesium ion concentration. Poly(acrylamides) are especially well known as being compatible in brines of up to only about 3% TDS.

A major advantage of these sulfomethylated melamine gel-forming compositions is that their gel time can be easily manipulated by the use of the optional gelling agents (e.g. sodium fluoroboate) as seen in the examples. Those skilled in the art will know that it is very desirable to emplace permeability modifiers the desired distance away from the well bore so that the permeability of the strata of the reservoir is modified to the desired extent. If the gel time is too short, then the gel will not be properly emplaced the desired distance away from the well bore, and there is a possibility of plugging the face of the well bore. If the gel time is too long, then although the gel may be properly emplaced into the reservoir, the well, either a producer or an injector, may have to be shut-in for an uneconomically long period of time. In high salinity brines and/or high hardness and at high temperatures it may not be necessary to use the optional gelling agent; however, in other cases it may be necessary to use the optional gelling agent in order to achieve a desirable gel time. Careful experimentation using the reservoir conditions will be required in order to achieve the desired gel times. Preferred gelling agents are the alkali metal and ammonium salts of fluoroboric and persulfurous acids. Other water soluble acid generating agents useful as gelling agents for this invention are compounds such as formaldehyde, glutaraldehyde, glyoxal, esters of carboxylic acids such as dimethyl maleate, dimethyl itaconate, triethyl citrate, or ethyl acetate, sodium persulfate, sodium hexametaphosphate, and mono-, di- and tribasic sodium phosphate.

The optional gel modifying agents of this invention impart certain beneficial properties to the resultant gels. The use of the gel modifying agents allows one to obtain gels at much lower concentrations of the gel-forming composition. This is especially true of the substituted aromatic amines such as p-sulfanilic acid, p-nitroaniline, p-aminobenzoic acid, 2,4-dinitroaniline and 2-naphthylamine. For example as seen in Table 2 of the Experimental Section, the use of the gel modifying agent allows one to use up to one-third as much gel-forming composition and obtain a useful gel with good permeability reduction. This is an important consideration when an economic analysis of the cost of performing a profile modification is done and substantial savings can be achieved by using a less costly composition.

When gelled, these compositions selectively modify the strata of the subterranean reservoir so that the flow of the drive or flooding fluids is altered throughout all of the treated strata of the reservoir. In addition, the porous medium containing the gelled compositions also has the very desirable property of being more permeable to oil than to water, an important advantage when the flooding fluid is brine or fresh water and large amounts of flooding fluid are co-produced with hydrocarbons in a hydrocarbon-bearing reservoir.

The sulfomethylated melamine gel-forming compositions of this invention also have good high pressure resistance as compared to xanthan gum and poly(acrylamide), currently available permeability modifiers. The pressure limit of a gel in a porous medium is defined as the point at which the permeability of a gelled porous medium rises sharply indicating that the gel was fractured or otherwise failed by the high pressure flooding fluid flow. In a sandpack experiment (see experiment 36) the pressure limit of the gelled sulfomethylated melamine composition was more than 2× that of poly(acrylamide) and more 3× that of xanthan gum. This property is a distinct advantage when fluid flooding at high pressures of a treated reservoir is anticipated.

A final advantage of these sulfomethylated melamine gel-forming compositions is that they are shear-thinning. This means that these compositions remain fluid and easily pumpable up to their gel point, and also that they have the property after the gel point of being able to reheal and gain viscosity after shearing. If gellation starts before the composition has been emplaced the desired distance away from the wellbore, then the gel would be sheared as it is forced through the formation by continued pumping. Thus, since the gelled composition can reheal after shearing, a successful treatment of the reservoir is more likely. In addition, if the gelled composition should be fractured due to excessive pumping pressure during some portion of the fluid fooding, these sulfomethylated melamine gel-forming compositions will reheal forming a cohesive gel. Thus, the reservoir will likely not require retreatment if for some reason the gel is inadvertently fractured.

Those skilled in the art of permeability modification know that the brine salinity and hardness as well as reservoir temperature will determine if a certain sulfomethylated melamine gel-forming composition will be useful under those specific conditions. Careful selection of the components of the gel will be necessary to achieve optimal gels that are useful for the permeability modification of subterranean reservoirs.

A further feature of this invention is a method for the selective modification of the permeability of the strata of a subterranean hydrocarbon-containing reservoir which comprises:

(A) introducing into a well in communication with the reservoir the gel-forming composition described above at a pH of 5-11; and
(B) shutting-in the well and allowing the composition to gel in the reservoir for 1 hr to 30 days.

The method wherein the strata comprise a part of a hydrocarbon-bearing subterranean reservoir from which hydrocarbons are recovered from a producer well and wherein the introduction into the producer well reduces water encroachment into the hydrocarbons being produced is preferred.

Yet another feature of this invention is a method for the recovery of hydrocarbons from a hydrocarbon-bearing subterranean reservoir that is undergoing fluid flooding by selective permeability modification of said reservoir comprising:

(A) introducing into the reservoir via an injector well a gel-forming composition as described above at a pH of 5-11;
(B) allowing the composition to gel in the reservoir for 1 hr to 30 days before resumption of fluid flooding of the reservoir via the so treated injector well; and
(C) resuming fluid flooding of the reservoir via the so treated injector well.

A final feature of this invention is a process for preparing aqueous gel-forming sulfomethylated melamine compositions, useful in the recovery of hydrocarbons from hydrocarbon-bearing reservoirs, comprising reacting for 1-10 hr at 50-95° C. in an aqueous medium:

(A) 1.0 molar equivalent of a melamine of the formula

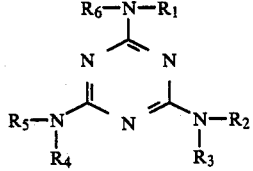

wherein $R_1$ through $R_6$ are selected from the group consisting of hydrogen; carboxymethyl; hydroxyethyl; 2,3-dihydroxypropyl and 2,3-epoxypropyl with the proviso that at least 2 of $R_1$ through $R_6$ be hydrogen and that the remainder of $R_1$ through $R_6$ be identical;

(B) 3.0-6.7 molar equivalents of formaldehyde or a 2-6 carbon atom containing dialdehyde such as glyoxal or glutaraldehyde.
(C) 0.25-1.25 molar equivalents of an alkali metal or ammonium salt of sulfurous acid;

(D) 0-1.5 molar equivalents of a gel-modifying agent selected from the group comprising:
(1) a ring substituted primary aniline or primary naphthylamine where the substituent is electron-withdrawing such as p-sulfanilic acid; p-nitroaniline; p-aminobenzoic acid, 2,4-dinitroaniline or 2-naphthylamine;
(2) poly(vinyl alcohol) of MW range 3,000-78,000;
(3) ethylene glycol;
(4) poly(acrylamide) of MW range 10,000-100,000;
(5) glycerol;
(6) a poly(oxyethylene) or poly(oxypropylene) primary amine or a poly(oxyethylene) or poly(oxypropylene) secondary di- or tri-amine of MW 300 to 2,000;
(7) formaldoxime; and
(8) primary and secondary polyamines containing from 2-30 carbon atoms; and (E) 0-5.0 molar equivalents of a gelling agent selected from the group comprising the alkali metal and ammonium salts of fluoroboric acid and persulfurous acid or water soluble acid generating agents which is added to the above aqueous composition immediately prior to use;

with the proviso that at least one of components (D) or (E) be present in at least a 0.01 molar equivalent amount when $R_1$ through $R_6$ are all hydrogen.

In the preferred method of forming the compositions of this invention, to an aqueous solution of formaldehyde is added sulfanilic acid, sodium sulfite, and aqueous sodium hydroxide. The slurry is heated and stirred to an internal temperature of 50° C. and melamine is added portionwise over a period of 1.5 hours while maintaining the temperature of the reaction mixture at 50-65° C. The reaction mixture is then heated at 90-95° C. for 5-6 hours following the end of the melamine addition. The mixture is then cooled and a clear, colorless gel-forming composition results.

Another method of forming the compositions of this invention, melamine is charged into a flask along with with sulfanilic acid monohydrate and sodium sulfite. This slurry is stirred vigorously and then the pH is adjusted to about 12 with sodium hydroxide solution. To the resulting mixture, formaldehyde is added and the mixture is heated for several hours at about 80-95° C. The mixture is then cooled and a clear, colorless gel-forming composition results.

The compositions of the invention can also be formed by simply stirring together melamine and formaldehyde and heating until nearly all solids are in solution. Then sodium sulfite is added and the mixture is heated again with stirring for several hours. The mixture is then poured onto ice to yield a clear, colorless gel-forming composition.

Alternatively, melamine, formaldehyde and sodium sulfite can all be added together with stirring and heating for several hours. The reaction mixture is then poured over ice to obtain the gel-forming composition. Numerous other ways of combining the components of the compositions of this invention will occur to the worker skilled in this field.

In the examples to follow, all reagents used were American Chemical Society reagent grade chemicals. The temperatures reported are uncorrected. Percent solids were determined by thin-film evaporation at 50° C., 0.5-1.0 mm, for 1 hour. Pressures to determine permeabilities were measured with Validyne pressure transducers. Viscosities were measured with various instruments and are reported individually.

EXAMPLE 1

To 5433 g (67.0 moles) of 37% formalin was added 195.4 g (1.13 mole) of sulfanilic acid, 718 g (5.70 mole) of sodium sulfite, and 89.4 g (1.12 mole) of 50% aqueous sodium hydroxide solution. The slurry was heated with stirring to an internal temperature of 50° C., then 1407 g (11.17 moles) of melamine was added portionwise over a period of 1.5 hours. The internal temperature was maintained at 50–65° C. during the melamine addition. The reaction mixture was then heated at 90–95° C. for 5–6 h following the end of the melamine addition. The resultant solution was then cooled to afford 7.7 kg of product which was 51% solids.

EXAMPLE 2

To 3,396 g (41.88 mole) of 37% aqueous formaldehyde solution was added 1,162 g of water, 120.9 g (0.698 mole) of sulfanilic acid, 55.9 g (0.698 mole) of 50% aqueous sodium hyroxide and 439.8 g (3.49 mole) of sodium sulfite. The slurry was stirred and heated to an internal temperature of 61° C. Then 879.5 g (6.98 mole) of melamine was added in 49 g portions, once every 5 min. for 1.5 h. The internal temperature was maintained at 60–65° C. during the addition of the melamine. The slurry was then heated to an internal temperature of 87–89° C. for 6.5 h. The resultant solution was cooled to room temperature and afforded 5,872 g of product which was 40% solids.

EXAMPLE 3

To a stirred mixture of 500 g (3.97 moles) of melamine and 250 g (1.98 moles) of sodium sulfite was added 1.9 1 (25.31 moles) of 37% formalin. The mixture was stirred at an internal temperature of 80–85° C. for 3.5 h, and 3.4 Kg of ice was added to the reaction mixture to afford 6.2 Kg of a clear, colorless polymer solution which was 24% TDS (total dissolved solids).

EXAMPLE 4

To 50.0 g (0.3968 moles) of melamine was added 190 ml (2.54 mole) of 37% formalin. The mixture was stirred and heated to an internal temperature of 65° C. for 0.75 h at which time nearly all solids were in solution. To this solution was added 25.0 g (0.1984 mole) of sodium sulfite. The stirred mixture was heated at an internal temperature of 70° C. for 4 h, then poured onto 340 g of ice to afford 610 g of clear, colorless polymer solution which was 24.8% TDS.

EXAMPLE 5

To 50.0 g (0.3968 mole) of stirred melamine was added 26.3 ml (0.3966 mole) of glycidol in 80 ml of water. The reaction mixture was heated at 90–95° C. for 1.5 h. The slurry was cooled to room temperature, then 149 ml (1.985 mole) of 37% formalin, followed by 25g (0.1984 mole) of sodium sulfite were added. The homogeneous, nearly colorless solution was cooled to room temperature to afford 340 g of polymer solution which was 48.9% TDS.

EXAMPLE 6

To a stirred mixture of 5.00 g (0.03968 mole) of melamine and 4.62 g (0.03968 mole) chloroacetic acid, sodium salt, was added 1.59 g (0.03968 mole) of sodium hydroxide in 10 ml of water. The reaction mixture was heated at 95–100° C. for 2.5 h. The slurry was cooled to 0° C., and 3.75 g (0.0298 mole) of sodium sulfite was added, followed by 14.9 ml (0.1984 mole) of 37% formalin. The reaction mixture was heated at 90–95° C. for 3 h, to afford 41 g of solution which was 46.9% TDS.

EXAMPLE 7

To 50.0 g (0.0397 mole) of melamine was added 2.66 ml (0.0397 mole) of ethylene chlorhydrin, 3.34 g (0.0397 mole) of sodium bicarbonate and 7 ml of water. The slurry was heated at 95–100° C. for 1.5 h. The slurry was cooled to 5° C. and 14.9 ml (0.1985 mole) of 37% formalin was added, followed by 2.50 g (0.0.199 mole) of sodium sulfite. The reaction mixture was heated at 95–100° C. for 3 h to afford a clear, yellow solution which was 51.16% TDS.

EXAMPLE 8

To a solution of 25.6 g (1.47 mole) of ethylene oxide in 70 ml of water was added 50.0 g (0.3968 mole) of melamine. To this stirred suspension was added 1 ml (7.44 mmole) of boron trifluoride etherate. The slurry was heated at 65° C. for 0.5 h, and 1 ml (7.44 mmole) of boron trifluoride etherate was again added. The slurry was heated at an internal temperature of 65–75° C. for an additional 0.5 h. Once more, 1 ml (7.44 mmole) of boron trifluoride etherate was added, and the reaction mixture was maintained at an internal temperature of 75° C. The slurry was then cooled to room temperature and 155 ml (2.0646 mole) of 37% formalin and 25.0 g (0.1984 mole) of sodium sulfite were added. The reaction mixture was heated at an internal temperature of 75° C. for 3 h to afford a slightly cloudy solution which was filtered to afford a clear yellow solution which was 50.6% TDS.

EXAMPLE 9

To a stirred mixture of 50.0 g (0.3968 mole) of melamine, 25.0 g (0.1984 mole) sodium sulfite and 100 g of 10% low molecular weight polyacrylamide was added 190 ml (2.531 mol) of 37% formalin. The mixture was heated at 70–75° C. for 4 h and then poured onto 260 g ice to afford 640 g of clear, colorless solution which was 25% TDS.

Synthesis of Low Molecular Weight Polyacrylamide

To 900 ml of nitrogen purged, stirred water was added 100 g (1.4069 mole) acrylamide and the mixture was heated to an internal temperature of 35° C. To the stirred mixture was added a solution of 10.00 g (0.0833 mole) of sodium bisulfite in 10 ml of water followed by a solution of 10.00 g (0.370 mole) of potassium persulfate in 10 ml of water. The reaction was allowed to slowly warm to an internal temperature of 56° C. After 2 h, 0.05 g (.000185 mole) of potassium persulfate was added and the reaction was maintained at 35° C. for 2 h to afford a clear, colorless solution of 10% polyacrylamide.

EXAMPLE 10

To 25.0 g of 100% hydrolyzed polyvinyl alcohol (MW = 14,000) was added 190 ml (2.531 mole) of 37% formalin. The mixture was stirred and heated at an internal temperature of 70° C. for 0.75 h to afford a viscous solution which was called solution A. To a stirred mixture of 50.00 g (0..3968 mole) of melamine, 50 ml of water and 12.5 g (0.0992 mole) of sodium sulfite was added the hot solution A. The mixture was stirred at 70–75° C. for 3.5 h, then diluted with 100 ml of water to afford 443 g of clear solution which was 36.2% TDS.

EXAMPLE 11

To 150 ml (2.000 mole) of 37% formalin was added 52 ml (0.3945 moles) of ethylene glycol. The solution was stirred at an internal temperature of 80° C. for 0.75 h. This was called solution A. To a stirred mixture of 50.00 g (0.3968 mole) of melamine and 25.0 g (0.2984 mole) of sodium sulfite was added the hot solution A. The reaction mixture was stirred at an internal temperature of 70–75° for 4 h. To this solution was added 60 g of ice to afford 310 g of clear, colorless solution which was 48% TDS.

EXAMPLE 12

To a stirred mixture of 25.0 g (0.1984 mole) of melamine, 11.92 g (0.1984 mole) of urea, 20.83 g (0.1653 mole) sodium sulfite, and 22 ml (0.3945 mole) of ethylene glycol was added 158 ml (2.1104 mole) of 37% formalin. The reaction mixture was stirred at an internal temperature of 75° for 3.5 h, then 82 g of ice was added to afford 352 g of clear, colorless polymer solution which was 48% TDS.

EXAMPLE 13

To 50.0 g (0.3968 mole) of stirred melamine was added 190 ml (2.538 mole) of 37% formalin. The mixture was stirred and warmed to an internal temperature of 55–60° C. for 30–40 min. To the nearly clear solution was added 39.9 g (0.03968 mole) of Jeffamine ED-600. The reaction mixture was stirred at 65° C. for 5–10 min and 25 g (0.1984 mole) of sodium sulfite was added. The reaction mixture was stirred for 4 h at 70° and poured onto 410 g of ice to afford 758 g of polymer solution which was 24% TDS.

EXAMPLE 14

To 50 ml of deionized water was added 10.00 g (0.0794 mole) of melamine and 38 ml (0.5076 mole) of 37% aqueous formalin. The stirred slurry was adjusted to pH 8 with 1N NaOH (10 drops). The reaction mixture was heated at an internal temperature of 60–65° C. for 1 h, then 0.53 ml (0.00794 mole) of ethylene diamine, followed by 5.0 g (0.397 mole) of sodium sulfite. The reaction mixture was heated at 80–85° C. for 3 h. and 50 ml of water was added to afford 154 g of clear solution which was 17.0% TDS.

EXAMPLE 15

To 50 ml of deionized water was added 0.6468 g (0.0079 mole) of formaldoxime.HCl. The solution was adjusted to pH 13 with 1N NaOH. To this solution was added 10.00 g (0.0794 mole) of melamine, and 36 ml (0.4764 mole) of 37% aqueous formalin. The slurry was heated to an internal temperature of 60–65°C. To this solution was added 5.00 g (0.0397 mole) of sodium sulfite. The solution was heated at 80–85° C. for 3 h, 50 ml of water was added to afford 160.9 g of clear solution which was 20% TDS.

EXAMPLE 16

To 50 ml of deionized water was added 1.30 g (0.0160 mole) of formaldoxime. The solution was adjusted to pH 13 with 1N NaOH. To this solution was added 10.00 g (0.0794 mole) of melamine and 36 ml (0.4764 mole) of 37% aqueous formalin. The slurry was heated at an internal temperature of 65° for 1.5 h. To the resultant solution was added 5.00 g (0.0397 mole) of sodium sulfite and the solution was heated at an internal temperature of 90–95° C. for 2 h. To this was added 50 ml of water to afford 157.1 g of clear solution which was 17.5% TDS.

EXAMPLE 17

To 50 ml of deionized water was added 2.60 g (0.0320 mole) of formaldoxime. The solution was adjusted to pH 13 with 1N NaOH. To this solution was added 10.00 g (0.0794 mole) of melamine and 36 ml (0.4764 mole) of 37% aqueous formalin. The slurry was heated at an internal temperature of 68–70° C. for 2 h. To the resultant solution was added 5.00 g (0.0397 mole) of sodium sulfite. The solution was heated at 90–95° C. for 2 h, to this solution was added 50 ml of water to afford 160.5 g of clear solution which was 18.3% TDS.

EXAMPLE 18

To 320 ml (4.2742 mole) of 37% aqueous formalin was added 13.31 g (0.0696 mole) of sulfanilic acid monohydrate, 43.84 g (0.3479 mole) sodium sulfite and 5.80 g (0.0696 mole) of 50% aqueous sodium hydroxide. The slurry was heated to an internal temperature of 80° C. and 87.68 g (0.6959 mole) of melamine was added to the hot solution via a screw feeder. The resultant solution was then heated at an internal temperature of 90–95° C. for 2.5 h to afford 497 g of clear, colorless solution which was 52% TDS.

EXAMPLE 19

To 50 ml of deionized water was added 10.00 g (6.0794) melamine, 1.52 g (0.00794 mole) of sulfanilic acid monohydrate, 6.00 g (0.0476 mole) of sodium sulfite, and 40 ml (0.5343 mole) of 37% aqueous formalin. The stirred slurry was adjusted to pH 12 with 1N NaOH and the reaction mixture was heated at an internal temperature of 80–85° C. for 5 h to afford 117.3 g of clear, colorless solution which was 22.76% TDS.

EXAMPLE 20

To 50 ml of stirred deionized water was added 10.00 g (0.0794 mole) of melamine, 1.52 g (0.00794 mole) of sulfanilic acid monohydrate, 7.00 g (0.0556 mole) of sodium sulfite, and 40 ml (0.5343 mole) of 35% aqueous formalin. The stirred slurry was adjusted to pH 12 with 1N NaOH and then heated at an internal temperature of 80–85° C. for 5 h to afford 115.9 g of clear, colorless solution which was 26.26% TDS.

EXAMPLE 21

A 5 l round bottom flask was charged with 85.76 g (0.6806 mole) of melamine, 13.04 g (0.0682 mole) of sulfanilic acid monohydrate, 68.61 g (0.5445 mole) of sodium sulfite and 500 ml of water. The slurry was vigorously stirred, and the pH was adjusted to 12 with 1N sodium hydroxide solution. To the resultant mixture was added 313.04 ml (4.1812 mole) of 37% aqueous formaldehyde. The reaction mixture was then heated for 5 hr at 80–85° C. The reaction mixture was cooled to room temperature to afford 1.0 kg of clear, colorless gel-forming composition which was 28.3% solids.

EXAMPLE 22

A stirred mixture of 10.00 g (0.0794 moles) of melamine, 0.76 g (0.0040 mole) of sulfanilic acid monohydrate, 0.55 g (0.0040 mole) of p-nitroaniline, 5.00 g (0.0397 mole) of sodium sulfite and 50 ml of water was adjusted to pH 12 with 1N sodium hydroxide. To the resultant mixture was added 40 ml (0.5343 mole) of 37% aqueous formaldehyde. The reaction mixture was then heated for 5 hr at 80-85° C. which on cooling was mixed with 10 ml of water to give 114.8 g of yellow gel-forming composition which was 26.0% solids.

EXAMPLE 23

To 50 ml of deionized water was added 10.00 g (0.0794 mole) of melamine, 0.76 g (0.0040 mole) of sulfanilic acid monohydrate, 0.55 g (0.0040 mole) p-aminobenzoic acid, and 5.00 g (0.0397 mole) of sodium sulfite. The stirred slurry was adjusted to pH 12 with 1N NaOH. To this slurry was added 40 ml (0.5343 mole) of 37% aqueous formalin. The reaction mixture was heated at an internal temperature of 80-85° C. for 5 h to afford 117.6 g of clear solution which was 25.4% TDS.

EXAMPLE 24

To 50 ml of deionized water was added 10.00 g (0.0794 mole) of melamine, 0.51 g (0.00265 mole) sulfanilic acid monohydrate, 0.36 g (0.00365 mole of p-aminobenzoic acid, 0.37 g (0.00265 mole) of p-nitroaniline, 5.00 g (0.0397 mole) of sodium sulfite and 40 ml (0.5343 mole) of 37% aqueous formalin. The stirred slurry was adjusted to pH 12 with 1N NaOH and heated at an internal temperature of 80-85° C. for 5 h to afford 114.3 g of clear solution which was 26.6% TDS.

EXAMPLE 25

A stirred mixture of 10.00 g (0.794 moles) of melamine, 40 ml (0.5343 moles) of 37% aqueous formaldehyde, 1.00 g (0.0072 mole) of p-nitroaniline, 5.00 g (0.0397 mole) of sodium sulfite, and 50 ml of water was heated at 80-85° C. for 5 h. Upon cooling to room temperature the resultant clear, yellow solution was diluted with 50 ml of water to give 158.0 g of gel-forming composition which was 19.7% solids.

EXAMPLE 26

To 50 ml of deionized water was added 10.00 g (0.794 mole) of melamine, 0.50 g (0.0040 mole) p-nitroaniline, 0.55 g of p-aminobenzoic acid, 40 ml (0.5343 mole) 37% aqueous formalin, 5.00 g (0.0397 mole) of sodium sulfite, and the slurry was adjusted to pH 12 with 1N NaOH. The slurry was heated at 80-85° C. for 5 h to afford 117.3 g of clear, yellow, solution which was 24.8% TDS.

EXAMPLE 27

To 50 ml of deionized water was added 10.00 g. (0.0794 mole) of melamine, 0.50 g (0.0036 mole) of p-nitroaniline, 0.55 g (0.0040 mole) of p-aminobenzoic acid, 40 ml (0.5343 mole) 37% aqueous formalin, 5.00 g (0.0397 mole) of sodium sulfite, and the slurry was adjusted to pH 12 with 1N NaOH. The slurry was heated at 80-85° C. for 5 h to afford 117.3 g of clear, yellow solution which was 24.8% TDS.

EXAMPLE 28

To 50 ml of stirred, deionized water was added 10.00 g (0.0794 mole) of melamine, 1.09 g (0.00794 mole) of p-aminobenzoic acid, 40 ml (0.5343 mole) of 37% aqueous formalin, and 5.00 g (0.0397 mole) of sodium sulfite. The slurry was stirred and heated at an internal temperature of 80-85° C. for 5 h. The resultant solution was diluted with 50 ml of water to afford 154.1 g of clear solution which was 17% TDS.

EXAMPLE 29

Example 28 was repeated except that 0.50 g (0.0036 mole) of p-aminobenzoic acid was used.

EXAMPLE 30

To 50 ml of stirred deionized water was added 10.00 g (0.0794 mole) of melamine, 1.09 g (0.00794 mole) of p-aminobenzoic acid, 7.00 g (0.0556 mole) of sodium sulfite and 40 ml (0.5343 mole) of 37% aqueous formalin. The slurry was stirred and heated at an internal temperature of 80-85° C. for 5 h to afford 114.7 g of clear solution which was 26.63% TDS.

EXAMPLE 31

To 50 ml of stirred, deionized water was added 10.00 g (0.0794 mole) of melamine, 1.00 g (0.0055 mole) of 2,4-dinitroaniline, 5.00 g (0.0397 mole) of sodium sulfite and 40 ml (0.5343 mole) of 37% aqueous formalin. The slurry was heated at an internal temperature of 80-85° C. for 5 h to afford 121.9 g of clear, yellow solution which was 26% TDS.

EXAMPLE 32

To 50 ml of stirred deionized water was added 10.00 g (0.0794 mole) of melamine, 1.00 g (0.0027 mole) of 2,4-dinitroaniline, 5.00 g (0.0397 mole) of sodium sulfite and 40 ml (0.5343 mole) of 37% aqueous formalin. The slurry was heated at 80-85° C. for 5 h to afford 114.4 g of clear, yellow solution which was 25.9% solids.

EXAMPLE 33

General Procedure for Preparation of Ampule Tests

The gel composition to be tested was dissolved in the selected brine to form a homogeneous solution, at the selected concentration. The pH's were adjusted, if necessary, using either 1N NaOH or 1N AcOH depending on the pH to be tested. Then, the gelling agent if used, was added and the resultant solution was injected into an ampule. The ampule was then sealed and immersed in an oil bath at the desired temperature. Ampules were inspected at regular intervals.

EXAMPLE 34

| Synthetic Sea Water (3.5% TDS). | |
| --- | --- |
| NaCl | 23.84 g/Kg of solution |
| $CaCl_2.2H_2O$ | 1.65 g/Kg of solution |
| $MgCl_2.6H_2O$ | 10.76 g/Kg of solution |
| $Na_2SO_4$ | 4.29 g/Kg of solution |
| $NaHCO_3$ | 0.205 g/Kg of solution |
| 7.5% TDS Brine | |
| NaCl | 58.52 g/liter of solution |
| $CaCl_2.2H_2O$ | 16.87 g/liter of solution |
| $MgCl_2.6H_2O$ | 8.03 g/liter of solution |
| 9.0% TDS Brine | |
| NaCl | 58.15 g/liter of solution |
| $CaCl_2$ | 6.64 g/liter of solution |
| $MgCl_2.6H_2O$ | 3.167 g/liter of solution |
| KCl | 23.84 g/liter of solution |
| 10.0% TDS Brine | |
| NaCl | 78.04 g/Kg of solution |
| $CaCl_2.2H_2O$ | 22.50 g/Kg of solution |
| $MgCl_2.6H_2O$ | 10.70 g/Kg of solution |
| 20.0% TDS Brine | |
| NaCl | 168.13 g/liter of solution |
| $CaCl_2.2H_2O$ | 31.84 g/liter of solution |
| $MgCl_2.6H_2O$ | 17.31 g/liter of solution |
| $KMnO_4$ | .098 g/liter of solution |
| $FeCl_3.6H_2O$ | .097 g/liter of solution |
| $Na_2SiO_3$ | .022 g/liter of solution |

TABLE 1

AMPULE EXPERIMENTS FOR SULFOMETHYLATED, MELAMINES AND COPOLYMERS

| Entry No.[2] | | Melamine | Formal-dehyde | Sodium Sulfite | Gel Modifying Agent | Gelling Agent[1] (ppm) | pH | Temp. °C. | Gel Time hours | Brine TDS | Polymer % Concentration | Comments |
|---|---|---|---|---|---|---|---|---|---|---|---|---|
| 1. | a. | 1.00 | 6.37 | 0.50 | — | — | 6-10 | 105 | 48 | 3.5 | 6.0 | Firm Gel |
| | b. | 1.00 | 6.37 | 0.50 | — | — | 6-10 | 105 | 48 | 9.0 | 6.0 | Firm Gel |
| | c. | 1.00 | 6.37 | 0.50 | — | NaBF$_4$(1666) | 6-10 | 70 | 48 | 3.5 | 6.0 | Firm Gel |
| | d. | 1.00 | 6.37 | 0.50 | — | Na$_2$S$_2$O$_2$(1200) | 8 | 70 | 48 | 20.0 | 6.0 | Gelatinous Precipitate |
| | e. | 1.00 | 6.37 | 0.50 | — | — | 8 | 92 | 96-120 | 20.0 | 6.0 | Gelatinous Precipitate |
| | f. | 1.00 | 6.37 | 0.50 | — | — | 8 | 105 | 48 | 20.0 | 6.0 | Gelatinous Precipitate |
| 2. | a. | 1.00 | 6.37 | 0.75 | — | NaBF$_4$(1666) | 6-10 | 70 | 48 | 20.0 | 6.0 | Firm Gel |
| | b. | 1.00 | 6.37 | 0.75 | — | — | 6-10 | 105 | 48 | 7.5 | 6.0 | Firm Gel |
| | c. | 1.00 | 6.37 | 0.75 | — | — | 6-10 | 105 | 48 | 20.0 | 6.0 | Firm Gel |
| 3. | a. | 1.00 | 5.00 | 0.50 | 1.00/Glycidol | — | 8 | 105 | 96-120 | 9.0 | 5.9 | Soft Gel |
| 4. | a. | 1.00 | 5.00 | 0.75 | 1.00/Chloroacetic acid | — | 8 | 105 | 48 | 20.0 | 5.5 | Loose Gel |
| 5. | a. | 1.00 | 5.20 | 0.50 | 1.00/Ethylene Chlorohydrin | — | 8 | 105 | 24 | 9.0 | 5.1 | Firm Gel |
| | b. | 1.00 | 5.20 | 0.50 | 1.00/Ethylene Chlorohydrin | — | 8 | 105 | 24 | 3.5 | 5.1 | Firm Gel |
| 6. | a. | 1.00 | 5.20 | 0.50 | 3.70/Ethylene Oxide | — | 7 | 105 | 16 | 9.0 | 6.1 | Medium-Firm Gel |
| | b. | 1.00 | 5.20 | 0.50 | 3.70/Ethylene Oxide | — | 7 | 92 | 35 | 9.0 | 6.1 | Medium-Firm Gel |
| | c. | 1.00 | 5.20 | 0.50 | 3.70/Ethylene Oxide | — | 9 | 92 | 16 | 9.0 | 6.1 | Medium-Firm Gel |
| 7. | a. | 1.00 | 6.40 | 0.50 | 0.36/Low m.w. Polyacrylamide | — | 7 | 105 | 168 | 3.5 | 6.25 | Gelatinous Precipitate |
| | b. | 1.00 | 6.40 | 0.50 | 0.36/Low m.w. Polyacrylamide | — | 7 | 105 | 48 | 3.5 | 6.25 | Gelatinous Precipitate, 50% syneresed |
| | c. | 1.00 | 6.40 | 0.50 | 0.36/Low m.w. Polyacrylamide | NaBF$_4$(1666) | 7 | 92 | 72 | 3.5 | 6.25 | Gelatinous Precipitate |
| 8. | a. | 1.00 | 6.38 | 0.25 | 1.43/Polyvinyl Alcohol | NaBF$_4$(1666) | 9 | 92 | 72 | 3.5 | 1.25 | Gel - 20% syneresis |
| 9. | a. | 1.00 | 5.00 | 0.50 | 1.00/Ethylene Glycol | NaBF$_4$(6,664) | 4.5 | 92 | 16 | 3.5 | 1.6 | Gelatinous Precipitate |
| | b. | 1.00 | 5.00 | 0.50 | 1.00/Ethylene Glycol | NaBF$_4$(6,664) | 8.5 | 92 | 24 | 3.5 | 1.6 | Gelatinous Precipitate |
| 10. | a. | 1.00 | 10.00 | 0.83 | 1.98/Ethylene Glycol 1.00/Urea | NaBF$_4$(3,332) | 8.5 | 92 | 15 | 3.5 | 1.2 | Loose Gel |
| 11. | a. | 1.00 | 6.40 | 0.50 | 0.10/Jeffamine ED-600 | NaBF$_4$(1,666) | 9.5 | 92 | 48 | 3.5 | 2.9 | Gelatinous Precipitate |
| | b. | 1.00 | 6.40 | 0.50 | 0.10/Jeffamine ED-600 | NaBF$_4$(3,332) | 7.0 | 92 | 48 | 3.5 | 2.9 | Gelatinous Precipitate |
| 12. | a. | 1.00 | 6.40 | 0.50 | 0.10/Ethylene diamine | NaBF$_4$(833) | 7.0 | 92 | 24 | 3.5 | 4.4 | Gelatinous Precipitate |
| | b. | 1.00 | 6.40 | 0.50 | 0.10/Ethylene diamine | NaBF$_4$(1,666) | 7.0 | 92 | 24 | 3.5 | 4.4 | Gelatinous Precipitate |
| 13. | a. | 1.00 | 6.40 | 0.50 | 0.10/Formaldoxime | NaBF$_4$(1,666) | 7.0 | 92 | 168 | 3.5 | 3.0 | No Gel |
| 14. | a. | 1.00 | 6.40 | 0.50 | 0.10/Formaldoxime | — | 7.0 | 92 | 24 | 3.5 | 3.0 | Loose Gel |
| | b. | 1.00 | 6.40 | 0.50 | 0.20/Formaldoxime | — | 7.0 | 92 | 168 | 3.5 | 2.5 | No Gel |
| | c. | 1.00 | 6.40 | 0.50 | 0.20/Formaldoxime | NaBF$_4$(1,400) | 7.0 | 92 | 24 | 3.5 | 2.5 | Loose Gel |
| 15. | a. | 1.00 | 6.40 | 0.50 | 0.40/Formaldoxime | — | 7.0 | 92 | 168 | 3.5 | 2.5 | Floc. Solids (90% syneresed) |
| | b. | 1.00 | 6.40 | 0.50 | 0.40/Formaldoxime | NaBF$_4$(1,167) | 7.0 | 92 | 24 | 3.5 | 2.5 | Floc. Solids (80% syneresed) |
| 16. | a. | 1.00 | 6.14 | 0.50 | 0.10/Sulfanilic Acid | NaBF$_4$(1,666) | 7.0 | 92 | 168 | 3.5 | 3.0 | No Gel |
| | b. | 1.00 | 6.14 | 0.50 | 0.10/Sulfanilic Acid | NaBF$_4$(1,666) | 7.0 | 92 | 168 | 3.5 | 2.5 | Soft Gel (30% syneresed) |
| | c. | 1.00 | 6.14 | 0.50 | 0.10/Sulfanilic Acid | NaBF$_4$(1,666) | 8.0 | 92 | 168 | 3.5 | 2.5 | Slightly firmer than 16b (20% syn) |
| | d. | 1.00 | 6.14 | 0.50 | 0.10/Sulfanilic Acid | NaBF$_4$(1,666) | 9.0 | 92 | 168 | 3.5 | 2.5 | Slightly firmer than 16c (15% syn) |
| | e. | 1.00 | 6.14 | 0.50 | 0.10/Sulfanilic Acid | NaBF$_4$(1,666) | 10.0 | 92 | 168 | 3.5 | 2.5 | Medium-Firm Gel (10% syneresed) |
| 17. | a. | 1.00 | 6.14 | 0.60 | 0.10/Sulfanilic Acid | NaBF$_4$(1,666) | 7.0 | 92 | 168 | 3.5 | 3.0 | Very loose Gel |
| | b. | 1.00 | 6.14 | 0.60 | 0.10/Sulfanilic Acid | NaBF$_4$(1,666) | 7.0 | 92 | 168 | 3.5 | 3.0 | Gelatinous Precipitate |
| | c. | 1.00 | 6.14 | 0.70 | 0.10/Sulfanilic Acid | — | 7.0 | 92 | 168 | 10.0 | 3.0 | No Gel |
| 18. | a. | 1.00 | 6.14 | 0.70 | 0.10/Sulfanilic Acid | NaBF$_4$(1,666) | 7.0 | 105 | 24 | 10.0 | 3.0 | Gelatinous Precipitate |
| 19. | a. | 1.00 | 6.14 | 0.80 | 0.10/Sulfanilic Acid | NaBF$_4$(1,666) | 7.0 | 92 | 168 | 10.0 | 3.0 | Loose Gel/Gelatinous Precipitate |
| | b. | 1.00 | 6.14 | 0.80 | 0.10/Sulfanilic Acid | NaBF$_4$(1,666) | 9.0 | 92 | 168 | 10.0 | 2.5 | Loose Gel/(20-30% syneresed) |
| 20. | | 1.00 | 6.14 | 0.50 | 0.05/Sulfanilic Acid | NaBF$_4$(1,666) | 7.0 | 92 | 168 | 3.5 | 2.5 | Loose Gel (30-40% syneresed) |

TABLE 1-continued
AMPULE EXPERIMENTS FOR SULFOMETHYLATED, MELAMINES AND COPOLYMERS

| Entry No.[2] | Polymer Component Stoichiometry (Molar Equivalents) | | | | Gelling Agent[1] (ppm) | pH | Temp. C. | Gel Time hours | Brine TDS | Polymer % Concentration | Comments |
|---|---|---|---|---|---|---|---|---|---|---|---|
| | Melamine | Formaldehyde | Sodium Sulfite | Gel Modifying Agent | | | | | | | |
| 21. | 1.00 | 6.14 | 0.50 | 0.05/p-Nitroaniline 0.05/Sulfanilic Acid | NaBF4(1,666) | 7.0 | 92 | 168 | 3.5 | 2.5 | Soft Gel (20% syneresed) |
| 22. | 1.00 | 6.14 | 0.50 | 0.05/p-Aminobenzoic Acid 0.03/Sulfanilic Acid 0.03/p-Aminobenzoic Acid | NaBF4(1,666) | 7.0 | 92 | 24-48 | 3.5 | 2.5 | Soft Gel (10% syneresed) |
| 23. | 1.00 | 6.14 | 0.50 | 0.03/p-Nitroaniline | — | 7.0 | 92 | 168 | 3.5 | 3.0 | No Gel |
| a. | 1.00 | 6.14 | 0.50 | 0.10/p-Nitroaniline | NaBF4(1,666) | 7.0 | 92 | 168 | 3.5 | 2.5 | Firm Gel (20% syneresed) |
| b. | 1.00 | 6.14 | 0.50 | 0.10/p-Nitroaniline | NaBF4(1,666) | 7.0 | 92 | 48 | 3.5 | 2.5 | Gel (20% syneresed) |
| 24. | 1.00 | 6.14 | 0.50 | 0.05/p-nitroaniline 0.05/p-Aminobenzoic Acid | | | | | | | |
| 25. | 1.00 | 6.14 | 0.60 | 0.05/p-Nitroaniline 0.05/p-Aminobenzoic Acid | NaBF4(1,666) | 7.0 | 92 | 48 | 3.5 | 2.5 | Very loose Gel |
| 26. | 1.00 | 6.14 | 0.50 | 0.10/p-Aminobenzoic Acid | NaBF4(1,666) | 7.0 | 92 | 48 | 3.5 | 2.0 | Firm Gel |
| 27. | 1.00 | 6.14 | 0.50 | 0.05/p-Aminobenzoic Acid | NaBF4(1,666) | 7.0 | 92 | 48 | 3.5 | 2.5 | Firm Gel |
| 28. | 1.00 | 6.14 | 0.70 | 0.10/p-Aminobenzoic Acid | NaBF4(1,666) | 7.0 | 92 | 48 | 10.0 | 2.5 | Loose Gel |
| 29. | 1.00 | 6.14 | 0.50 | 0.05/2,4-dinitroaniline | NaBF4(1,666) | 7.0 | 92 | 48 | 3.5 | 2.5 | Loose Gel |
| 30. | 1.00 | 6.14 | 0.50 | 0.007/2,4-dinitroaniline | NaBF4(1,666) | 7.0 | 92 | 24 | 3.5 | 2.5 | Gelatinous Precipitate |
| 31. | 1.0 | 6.0 | 0.5 | 0.10/SULFANILIC ACID | GLYOXAL(15,000) | 7.0 | 90 | 1.5 | 3.5 | 3.0 | GELATINOUS PRECIPITATE |
| 32. | 1.0 | 6.0 | 0.5 | 0.10/SULFANILIC ACID | GLYOXAL(5,000) | 7.0 | 90 | 3.0 | 3.5 | 3.0 | FIRM GEL |
| 33. | 1.0 | 6.0 | 0.5 | 0.10/SULFANILIC ACID | GLYOXAL(500) | 7.6 | 90 | 24.0 | 3.5 | 3.0 | FIRM GEL |
| 34. | 1.0 | 6.0 | 0.5 | 0.10/SULFANILIC ACID | GLUTARALDEHYDE(15,000) | 7.0 | 90 | 24.0 | 3.5 | 3.0 | FIRM GEL |
| 35. | 1.0 | 6.0 | 0.5 | 0.10/SULFANILIC ACID | GLUTARALDEHYDE(5,000) | 7.0 | 90 | 48.0 | 3.5 | 3.0 | NO GEL |
| 36. | 1.0 | 6.0 | 0.5 | 0.10/SULFANILIC ACID | FORMALDEHYDE(5,000) | 7.0 | 90 | 3.0 | 3.5 | 3.0 | FIRM GEL |
| 37. | 1.0 | 6.0 | 0.5 | 0.10/SULFANILIC ACID | DIMETHYL MALEATE(5,000) | 7.0 | 90 | 4.0 | 3.5 | 3.0 | FIRM GEL |
| 38. | 1.0 | 6.0 | 0.5 | 0.10/SULFANILIC ACID | DIMETHYL ITACONATE(5,000) | 7.0 | 90 | 16.0 | 3.5 | 3.0 | FIRM GEL |
| 39. | 1.0 | 6.0 | 0.5 | 0.10/SULFANILIC ACID | NaBF4(250) | 7.1 | 90 | 45.0 | 3.5 | 3.0 | FIRM GEL |
| 40. | 1.0 | 6.0 | 0.5 | 0.10/SULFANILIC ACID | SHMP(1,000) | 6.7 | 90 | 24.0 | 3.5 | 3.0 | FIRM GEL |
| 41. | 1.0 | 6.0 | 0.5 | 0.10/SULFANILIC ACID | SHMP(500) | 6.9 | 105 | 10.0 | 3.5 | 3.0 | FIRM GEL |
| 42. | 1.0 | 6.0 | 0.5 | 0.10/SULFANILIC ACID | SHMP(250) | 7.4 | 105 | 24.0 | 3.5 | 3.0 | FIRM GEL |
| 43. | 1.0 | 6.0 | 0.5 | 0.10/SULFANILIC ACID | SHMP(100) | 7.8 | 105 | 42.0 | 3.5 | 3.0 | FIRM GEL |
| 44. | 1.0 | 6.0 | 0.5 | 0.10/SULFANILIC ACID | NaBF4(1,000) | 7.0 | 70 | 24.0 | 3.5 | 3.0 | FIRM GEL |
| 45. | 1.0 | 6.0 | 0.5 | 0.10/SULFANILIC ACID | GLYOXAL(5,000) | 7.4 | 70 | 45.0 | 3.5 | 3.0 | FIRM GEL |
| 46. | 1.0 | 6.0 | 0.5 | 0.10/SULFANILIC ACID | GLYOXAL(2,500) | 7.3 | 70 | 66.0 | 3.5 | 3.0 | FIRM GEL |
| 47. | 1.0 | 6.0 | 0.5 | 0.10/SULFANILIC ACID | SHMP(5,000) | 5.8 | 70 | 10.0 | 3.5 | 3.0 | FIRM GEL |
| 48. | 1.0 | 6.0 | 0.5 | 0.10/SULFANILIC ACID | TRIETHYL CITRATE(1,000) | 7.5 | 70 | 6-21 | 3.5 | 3.0 | GELATINOUS PRECIPITATE |
| 49. | 1.0 | 6.0 | 0.5 | 0.10/SULFANILIC ACID | TRIETHYL CITRATE(250) | 7.5 | 70 | 6-21 | 10.0 | 3.0 | GELATINOUS PRECIPITATE |
| 50. | 1.0 | 6.0 | 0.5 | 0.10/SULFANILIC ACID | TRIETHYL CITRATE(100) | 7.5 | 90 | 6-21 | 10.0 | 3.0 | GELATINOUS PRECIPITATE |
| 51. | 1.0 | 6.0 | 0.5 | 0.10/SULFANILIC ACID | TRIETHYL CITRATE(500) | 7.5 | 105 | 28.0 | 10.0 | 3.0 | GELATINOUS PRECIPITATE |
| 52. | 1.0 | 6.0 | 0.5 | 0.10/SULFANILIC ACID | TRIETHYL CITRATE(250) | 8.2 | 105 | 40.0 | 3.5 | 3.0 | GELATINOUS PRECIPITATE |
| 53. | 1.0 | 6.0 | 0.5 | 0.10/SULFANILIC ACID | ETHYL ACETATE(2,500) | 8.2 | 105 | 21.0 | 3.5 | 3.0 | GELATINOUS PRECIPITATE |
| 54. | 1.0 | 6.0 | 0.5 | 0.10/SULFANILIC ACID | ETHYL ACETATE(1,000) | 7.5 | 70 | 40.0 | 10.0 | 3.0 | GELATINOUS PRECIPITATE |
| 55. | 1.0 | 6.0 | 0.5 | 0.10/SULFANILIC ACID | ETHYL ACETATE(250) | 7.5 | 70 | 6-21 | 10.0 | 3.0 | GELATINOUS PRECIPITATE |
| 56. | 1.0 | 6.0 | 0.5 | 0.10/SULFANILIC ACID | ETHYL ACETATE(100) | 7.5 | 90 | 6-16 | 10.0 | 3.0 | GELATINOUS PRECIPITATE |
| 57. | 1.0 | 6.0 | 0.5 | 0.10/SULFANILIC ACID | ETHYL ACETATE(1,000) | 8.2 | 90 | 48-72 | 3.5 | 3.0 | GELATINOUS PRECIPITATE |
| 58. | 1.0 | 6.0 | 0.5 | 0.10/SULFANILIC ACID | ETHYL ACETATE(500) | 8.2 | 105 | 40.0 | 3.5 | 3.0 | GELATINOUS PRECIPITATE |

[1]PPM Based on total weight of gel mixture.
[2]Entries 1-8 are sulfomethylated melamines, 9-15 are aliphatic copolymerizations and 16-30 are aromatic copolymerizations.
SHMP = SODIUM HEXAMETAPHOSPHATE

EXAMPLE 35

Sandpacks were prepared from a mixture of New England silica sand consisting of two lots of particle size distributions of −60+80 mesh and −200 mesh in a weight ratio between 5 parts to 1, and 9 parts to 1, respectively. The sand mixture was packed in 12 in. long by 1 in. inside diameter stainless steel cylinders with the top and bottom 1¾ in. packed with −60+80 mesh sand. Pressure taps were located on the cylinder at the inlet, the outlet, 2.0 in. from the inlet and 2.0 in. from the outlet. The sandpack was saturated with tap water and then placed in an oven at the desired temperature. Brine of the desired TDS was injected into the sandpack at several flow rates to attain stable pressure readings at each flow rate. Experiments were done at 50 psig back-pressure regulated at the outlet to prevent liquids from vaporizing. The absolute permeabilities (k) were determined by measuring flow rates and pressure drops across the sandpack and across the two taps on the sandpack. Parafin oil (Fischer Scientific USP) was injected at several flow rates into the sandpack until brine was no longer displaced and at a steady pressure drop; the permeability of the sandpack to oil at residual brine saturation was then determined. The sandpack was then injected with the desired brine at several flow rates until oil was no longer displaced and at steady pressure drop. The permeability of the sandpack to brine at residual oil saturation was then determined.

Table 2 summarizes the sandpack experiments of a number of gel-forming compositions. The gel-forming compositions were dissolved in the indicated brines at the indicated pH. The resultant solutions were injected from an accumulator at room temperature into the sandpack at 1 cc/min for 40 min. Brine (10 ml) was injected into the system to flush the gel-forming solution from the tubing between the accumulator and the sandpack and into the sandpack. The gel-forming composition was then allowed to gel in the sandpack. As a check for the gel time, the gel-forming solution was also injected into an ampoule as described in Example 33 and the gel time at the indicated temperature was determined.

After the gel formed in the ampoule, brine was injected at several flow rates into the sandpack and the permeability to brine was determined. Parafin oil was then injected into the sandpack at several flow rates until residual water saturation was attained and the permeability to oil was determined. Brine flood was resumed again at several flow rates to determine the permeability to brine.

TABLE 2
SANDPACK RESULTS

| ENTRY NO. | POLYMER COMPONENT STOICHIOMETRY (MOLAR EQUIVALENTS) | | | | GELLING AGENT[1] (PPM) | pH | TEMP., °C. |
|---|---|---|---|---|---|---|---|
| | MELAMINE | FORMALDEHYDE | SODIUM SULFITE | GEL MODIFYING AGENT | | | |
| 1 | 1.00 | 6.37 | 0.50 | — | — | 8.0 | 105 |
| 2 | 1.00 | 6.37 | 0.50 | — | NaBF$_4$(1,666) | 9.5 | 92 |
| 3 | 1.00 | 6.30 | 0.75 | — | NaBF$_4$(1,666) | 8.0 | 70 |
| 4 | 1.00 | 5.00 | 0.50 | 1.00/Glycidol | — | 8.5 | 105 |
| 5 | 1.00 | 5.20 | 0.50 | 1.47/Ethylene Oxide | — | 7.0 | 105 |
| 6 | 1.00 | 6.14 | 0.50 | 0.10/Sulfanilic acid | NaBF$_4$(1,666) | 7.0 | 92 |
| 7 | 1.00 | 6.14 | 0.50 | 0.10/p-Nitroaniline | NaBF$_4$(1,666) | 8.0 | 92 |
| 8 | 1.00 | 6.14 | 0.50 | 0.10/p-Aminobenzoic acid | NaBF$_4$(1,666) | 8.2 | 92 |
| 9 | 1.00 | 6.14 | 0.50 | 0.10/2,4-Dinitroaniline | NaBF$_4$(1,000) | 7.0 | 92 |
| 10 | 1.00 | 6.14 | 0.50 | 0.05/p-Nitroaniline and 0.05/Sulfanilic acid | NaBF$_4$(3,333) | 7.0 | 92 |
| 11 | 1.00 | 6.00 | 0.50 | 0.10/Sulfanilic acid | NaBF$_4$(2500) | 7.0 | 90 |
| 12 | 1.00 | 6.00 | 0.50 | 0.10/Sulfanilic acid | Formaldehyde(5000) | 7.0 | 90 |
| 13 | 1.00 | 6.00 | 0.50 | 0.10/Sulfanilic acid | Glyoxal(5000) | 7.0 | 90 |
| 14 | 1.00 | 6.00 | 0.50 | 0.10/Sulfanilic acid | Dimethyl Maleate(5000) | 7.0 | 90 |
| 15 | 1.00 | 6.00 | 0.50 | 0.10/Sulfanilic acid | Glyoxal(500) | 7.5 | 90 |
| 16 | 1.00 | 6.00 | 0.50 | 0.10/Sulfanilic acid | Glyoxal(500) | 6.3 | 70 |
| 17 | 1.00 | 6.00 | 0.50 | 0.10/Sulfanilic acid | Glyoxal(2500) | 6.6 | 70 |
| 18 | 1.00 | 6.00 | 0.50 | 0.10/Sulfanilic acid | Glyoxal(250) | 7.0 | 70 |
| 19 | 1.00 | 6.00 | 0.50 | 0.10/Sulfanilic acid | NaBF$_4$(1000) | 7.3 | 70 |
| 20 | 1.00 | 6.00 | 0.50 | 0.10/Sulfanilic acid | NaBF$_4$(250) | 7.5 | 70 |
| 21 | 1.00 | 6.00 | 0.50 | 0.10/Sulfanilic acid | SHMP(5000) | 5.8 | 70 |
| 22 | 1.00 | 6.00 | 0.50 | 0.10/Sulfanilic acid | — | 7.5 | 90 |
| 23 | 1.00 | 6.00 | 0.50 | 0.10/Sulfanilic acid | — | 7.3 | 90 |
| 24 | 1.00 | 6.00 | 0.50 | 0.10/Sulfanilic acid | — | 7.3 | 90 |
| 25 | 1.00 | 6.00 | 0.50 | 0.10/Sulfanilic acid | — | 7.3 | 90 |

| ENTRY NO. | GEL TIME, HOURS (AMPOULE) | BRINE, % TDS | POLYMER CONC., % | PERMEABILITY, k (DARCY) | | | | | | SHUT-IN TIME, DAYS |
|---|---|---|---|---|---|---|---|---|---|---|
| | | | | k-BEFORE TREATMENT | | | k-AFTER TREATMENT | | | |
| | | | | $k_{w1}$[2] | $k_{o1}$[3] | $k_{w2}$[4] | $k_{w3}$[5] | $k_{o2}$[6] | $k_{w4}$[7] | |
| 1 | 24–48 | 9.0 | 6.0 | 0.643 | 0.835 | 0.257 | 0.062 | 0.471 | 0.059 | 2 |
| 2 | 96 | 3.5 | 2.5 | 0.513 | 0.720 | 0.228 | 0.111 | 1.020 | 0.127 | 6 |
| 3 | 48 | 20.0 | 6.0 | 0.582 | 1.193 | 0.081 | 0.010 | 0.290 | 0.011 | 3 |
| 4 | 96–120 | 9.0 | 4.0 | 3.856 | 2.532 | 1.542 | 0.214 | 2.142 | 0.406 | 9 |
| 5 | 48 | 9.0 | 6.0 | 0.214 | 1.006 | 0.192 | 0.119 | 0.515 | 0.107 | 4 |
| 6 | 48 | 3.5 | 2.5 | 1.329 | 1.430 | 0.443 | 0.010 | 0.913 | 0.058 | 6 |
| 7 | 48 | 3.5 | 3.0 | 1.329 | 2.290 | 0.664 | 0.024 | 0.913 | 0.106 | 4 |
| 8 | 48 | 3.5 | 3.0 | 0.886 | 1.393 | 0.199 | 0.020 | 0.873 | 0.054 | 2.5 |
| 9 | 48 | 3.5 | 2.0 | 0.997 | 1.450 | 0.362 | 0.379 | 1.375 | 0.362 | 5 |
| 10 | 48 | 3.5 | 2.5 | 0.275 | 0.990 | 0.204 | 0.149 | 0.868 | 0.141 | 5 |
| 11 | 3 | 3.5 | 3.0 | 1.993 | 1.873 | 1.329 | 0.013 | 0.610 | 0.121 | 7 |
| 12 | 8 | 3.5 | 3.0 | 3.986 | 1.983 | 1.595 | 0.012 | 0.365 | 0.112 | 7 |
| 13 | 3 | 3.5 | 3.0 | 3.986 | 1.945 | 1.329 | 0.023 | 0.789 | 0.142 | 7 |
| 14 | 5 | 3.5 | 3.0 | 3.986 | 2.340 | 0.993 | 0.013 | 0.563 | 0.114 | 7 |

TABLE 2-continued
SANDPACK RESULTS

| 15 | — | 3.5  | 3.0 | 3.067 | 1.960 | 1.993 | 0.006 | 0.395 | 0.082 | 7 |
| 16 | — | 3.5  | 3.0 | 2.494 | 2.028 | 1.587 | 0.014 | 0.514 | 0.040 | 7 |
| 17 | — | 3.5  | 3.0 | 2.183 | 1.786 | 0.616 | 0.017 | 0.278 | 0.032 | 7 |
| 18 | — | 10.0 | 3.0 | 2.278 | 1.855 | 1.091 | 0.014 | 0.594 | 0.142 | 7 |
| 19 | — | 10.0 | 3.0 | 1.885 | 1.769 | 1.225 | 0.008 | 0.398 | 0.037 | 7 |
| 20 | — | 10.0 | 3.0 | 2.095 | 2.036 | 1.218 | 0.009 | 0.415 | 0.033 | 7 |
| 21 | — | 3.5  | 3.0 | 1.746 | 1.721 | 0.952 | 0.009 | 0.278 | 0.020 | 7 |
| 22 | — | 10.0 | 3.0 | 2.098 | 1.723 | 1.246 | 0.011 | 0.465 | 0.042 | 7 |
| 23 | — | 10.0 | 3.0 | 1.190 | 1.580 | 0.540 | 0.014 | 0.535 | 0.020 | 7 |
| 24 | — | 10.0 | 3.0 | 0.602 | 0.828 | 0.121 | 0.010 | 0.628 | 0.027 | 7 |
| 25 | — | 10.0 | 2.0 | 2.215 | 1.915 | 1.661 | 0.072 | 1.198 | 0.443 | 7 |

FOOTNOTES
SHMP = Sodium Hexametaphosphate
[1] PPM based on total weight of solution
[2] $k_{w1}$ = Initial brine permeability
[3] $k_{o1}$ = Initial oil permeability after brine flood
[4] $k_{w2}$ = Brine permeability after oil flood
[5] $k_{w3}$ = Brine permeability after gel treatment
[6] $k_{o2}$ = Oil permeability after gel treatment and brine flood
[7] $k_{w4}$ = Brine permeability after gel treatment and after second oil flood

EXAMPLE 36

A gel-forming composition as described in Entry No. 1 of Table 2 was injected into a sandpack as described in Example 35. At the same time two solution of xanthan gum (0.2 percent)/Cr(III)(75 ppm) and poly(acrylamide) (0.5 percent)/Cr(III)(400 ppm) were injected into two other sandpacks. The experimental temperature was 105° C. After the gel had formed, a brine flow of 1 cc per min. was injected into the sandpack to determine the permeability of the sandpack to brine and the pressure drop across the sandpack. The brine flow rate was then gradually increased with a corresponding pressure increase. Permeability of the gelled porous medium remained about the same until the pressure gradient exceeded a critical point. At this point permeability rose sharply indicating that the gel was disturbed by the high pressure flooding brine. This pressure gradient is called the pressure limit of the gel in this porous medium. The pressure limits of the gels are as follows:

| Composition of Entry No. 1 of Table 2 | 250 psi/ft |
| Poly(acrylamide)/Cr(III) | 120 psi/ft |
| Xanthan Gum/Cr(III) | 70 psi/ft |

We claim:
1. A method for the selective modification of the permeability of the strata of a subterranean hydrocarbon-containing reservoir which comprises:
 (A) introducing into a well in communication with said reservoir; an aqueous gel-forming composition, comprising a 1.0–60.0 weight percent sulfomethylated melamine polymer solution prepared by reacting:
 (A) 1.0 molar equivalent of a melamine of the formula:

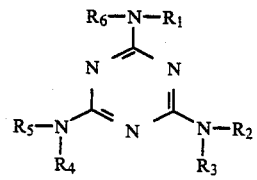

wherein $R_1$ through $R_6$ are selected from the group consisting of hydrogen; carboxymethyl; hydroxyethyl; 2, 3-dihydroxypropyl and 2, 3-epoxypropyl with the proviso that at least 2 of $R_1$ through $R_6$ be hydrogen and the remainder of $R_1$ through $R_6$ be identical;
 (B) 3.0–6.7 molar equivalents of formaldehyde or a 2–6 carbon atom containing dialdehyde;
 (C) 0.25–1.25 molar equivalents of an alkali metal or ammonium salt of sulfurous acid;
 (D) 0.01–1.5 molar equivalents of a gel-modifying agent, said gel-modifying agent functioning to lower the gel-forming amounts of components (A), (B) and (C) necessary to form a gel-forming composition, said gel-modifying agent selected from the group consisting of
  (1) a ring-substituted primary aniline or primary naphthylamine where the substituent is electron-withdrawing;
  (2) poly (vinyl alcohol) of MW range 3,000–78,000;
  (3) poly (acrylamide) of MW range 10,000–100,000;
  (4) glycerol;
  (5) a poly (oxyethylene) or poly (oxypropylene) primary amine or a poly (oxyethylene) or poly (oxypropylene) secondary di- or tri- amine of MW 300–2,000; and
  (6) formaldoxime;
 for 1–10 hour at 50–95° C. in an aqueous medium; followed by;
 (E) 0–5.0 molar equivalents of a water-soluble, acid-generating, gelation-time-regulating agent, said water-soluble acid-generating, gelation-time-regulating agent selected from the group consisting of alkali metal and ammonium salts of fluoroboric acid and persulfurous acid, formaldehyde, glutaraldehyde, glyoxal, dimethyl maleate, dimethyl itaconate, triethyl citrate, ethyl acetate, sodium hexametaphosphate and sodum mono, di- or tribasic phosphate; said composition introduced at a pH of 5-11; and
 (B) shutting-in the well and allowing said composition to gel in the reservoir for 1 hour to 30 days.
2. The method of claim 1 wherein said strata comprise a part of a hydrocarbon- bearing subterranean reservoir from which hydrocarbons are recovered from a producer well and wherein said introduction into the producer well reduces water encroachment into said hydrocarbons being produced.
3. The method of claim 1 wherein in said gel-forming composition, $R_1$ through $R_6$ are hydrogen, component (B) is formaldehyde and said gel-modifying agent is sulfanilic acid.

4. A method for the recovery of hydrocarbons from a hydrocarbon-bearing subterranean reservoir that is undergoing fluid flooding by selective permeability modification of said reservoir comprising:
  (A) introducing into said reservoir via an injector well an aqueous gel-forming composition comprising a 1.0-60.0 weight percent sulfomethylated melamine polymer solution prepared by reacting:
  (A) 1.0 molar equivalent of a melamine of the formula:

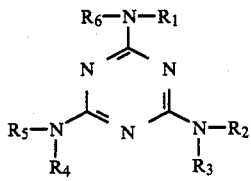

wherein $R_1$ through $R_6$ are selected from the group consisting of hydrogen; carboxymethyl; hydroxyethyl; 2, 3-dihydroxypropyl and 2, 3-epoxypropyl with the proviso that at least 2 of $R_1$ through $R_6$ be hydrogen and the remainder of $R_1$ through $R_6$ be identical;
  (B) 3.0-6.7 molar equivalents of formaldehyde or a 2-6 carbon atom containing dialdehyde;
  (C) 0.25-1.25 molar equivalents of an alkali metal or ammonium salt of sulfurous acid;
  (D) 0.01-1.5 molar equivalents of a gel-modifying agent, said gel-modifying agent functioning to lower the gel-forming amounts of components (A), (B) and (C) necessary to form a gel-forming composition, said gel-modifying agent selected from the group consisting of
    (1) a ring-substituted primary aniline or primary naphthylamine where the substituent is electron-withdrawing;
    (2) poly (vinyl alcohol) of MW range 3,000-78,000;
    (3) poly (acrylamide) of MW range 10,000-1000,000;
    (4) glycerol;
    (5) a poly (oxyethylene) or poly (oxypropylene) primary amine or a poly (oxyethylene) or poly (oxypropylene) secondary di- or tri- amine of MW 300-2,000; and
    (6) formaldoxime;
  for 1-10 hour at 50-95° C. in an aqueous medium followed by;
  (E) 0-5.0 molar equivalents of a water-soluble, acid-generating, gelation-time-regulating agent, said water-soluble acid-generating, gelation-time-regulating agent selected from the group consisting of alkali metal and ammonium salts of fluoroboric acid and persulfurous acid, formaldehyde, glutaraldehyde, glyoxal, dimethyl maleate, dimethyl itaconate, triethyl citrate, ethyl acetate, sodium hexametaphosphate and sodium mono, di- or tribasic phosphate, said composition introduced at a pH of 5-11;
  (B) allowing said composition to gel in the reservoir for 1 hr to 30 days before resumption of fluid flooding of the reservoir via the so treated injector well; and
  (C) resuming fluid flooding of said reservoir via the so treated injector well.

5. The method of claim 4 wherein in said gel-forming composition, $R_1$ through $R_6$ are hydrogen, component (B) is formaldehyde and said gel-modifying agent is sulfanilic acid.

* * * * *